UNITED STATES PATENT OFFICE.

PAUL THOMASCHEWSKI AND PAUL TUST, OF VOHWINKEL, NEAR ELBERFELD, GERMANY, ASSIGNORS TO SYNTHETIC PATENTS CO., INC., OF NEW YORK, N. Y., A CORPORATION OF NEW YORK.

COLOR-LAKES.

1,126,664.  Specification of Letters Patent.  Patented Jan. 26, 1915.

No Drawing.   Application filed July 7, 1914.  Serial No. 849,569.

*To all whom it may concern:*

Be it known that we, PAUL THOMASCHEWSKI, doctor of philosophy, chemist, and PAUL TUST, chemist, citizens of the German Empire, residing at Vohwinkel, near Elberfeld, Germany, have invented new and useful Improvements in Color-Lakes, of which the following is a specification.

We have found that the 1-amino-4-oxyanthraquinone sulfonic acids yield valuable pigments or lakes when treated with alumina as substratum. The new lakes have a valuable clear red-violet to violet-blue shade and are fast to light.

In order to illustrate the new process more fully the following examples are given, the parts being by weight:

Example 1. One part of 1-amino-4-oxyanthraquinone-3-sulfonic acid is dissolved in 10-15 times the quantity of water and then boiled in 100 parts of water with a solution of 10 parts of aluminium sulfate (18 per cent. $Al_2O_3$) and while being hot precipitated by addition of a solution of 4 parts of soda ash in 40 parts of water. The lake is filtered off, washed, dried and ground. It shows very fast and clear violet shades.

Example 2. 3 parts of 1-amino-4-oxyanthraquinone-2-sulfonic acid are dissolved in 15 times the quantity of hot water and boiled during half an hour with 100 parts of aluminium hydrate (10 per cent. paste) then the lake is filtered off and washed. It represents a brilliant violet lake with a bluer shade than the product of Example 1.

In the same manner a lake containing also baryta can be produced when before boiling barium chlorid is added to the mass of the reaction of Examples 1 and 2. In the same way also other sulfonic acids of the 1.4-aminooxyanthraquinone may be used.

Any other method for producing pigments or lakes can be used.

We claim:—

1. The new alumina color lakes prepared from 1-amino-4-oxyanthraquinone sulfonic acids, said lakes being distinguished by their valuable red-violet to violet-blue shades and their fastness to light, substantially as described.

2. The new alumina color lake prepared from 1-amino-4-oxyanthraquinone-3-sulfonic acid, said lake being distinguished by its valuable violet shade and its fastness to light, substantially as described.

In testimony whereof we have hereunto set our hands in the presence of two subscribing witnesses.

PAUL THOMASCHEWSKI. [L. S.]
PAUL TUST. [L. S.]

Witnesses:
HELEN NUFER,
FRANCES NUFER.